United States Patent Office 3,332,228
Patented July 25, 1967

3,332,228
POLYPROPYLENE BALING TWINE
Leonard Chill, Richmond, Calif., assignor to Chevron Research Company, a corporation of Delaware
No Drawing. Filed June 25, 1965, Ser. No. 467,116
15 Claims. (Cl. 57—155)

This application is a continuation-in-part of copending application U.S. Ser. No. 366,909, filed May 12, 1964, and now abandoned.

This invention concerns polypropylene twine and its manufacture. More particularly, this invention concerns polypropylene baling twine and its manufacture.

In binding harvest crops together into a bundle or bale, twine is mechanically wrapped around the stalks, knotted and the twine cut, while keeping the bundle of stalks under pressure. The most common baling twine is made from natural fibers, such as sisal and henequen. The sisal twine, which is exemplary of baling twines of natural fibers, suffers from a number of disadvantages. Generally, the diameter is not uniform and the twine has thick and thin sections. The thin sections reduce the strength of the twine. Furthermore, sisal, when in the field, is subject to rotting under adverse weather conditions, e.g., severe dampness. Moreover, the natural fibers have been subject to wide fluctuations in both price and availability. There has, therefore been a continuing effort to obtain a satisfactory alternative to sisal baling twine.

Till now, efforts to make satisfactory baling twine from a material other than sisal have been thwarted because of the stringent demands on an acceptable twine. In part, the fact that most of the machinery, both in the factory and in the field, has been directed toward the use of sisal twine has seriously hindered finding an alternative to sisal twine. Even more important are the requisites that the twine have sufficient strength to withstand the tension to which it is subjected, be capable of holding a knot, be readily cut, and be resistant to abrasion, which have eliminated most, if not all, of the alternatives which have been disclosed in the art as commercial competitors to sisal twine. Not only must these criteria be fulfilled, but for proper functioning of the baler, the ball of baling twine must be stable until all the twine has been used. That is, as the twine is fed from the center of the ball, the ball of twine must neither telescope nor collapse.

Pursuant to this invention, polypropylene twine is made from one or more strips or ribbons of unidirectionally oriented, predominantly isotactic polypropylene film, preferably internally lubricated, by collapsing and twisting the strip or strips under conditions which set the film as a twine.

The strips(s) used in preparing the twine will be considered first. The polypropylene will have at least 85% isotacticity and more usually at least 95% isotacticity. (By isotacticity is intended insolubility in refluxing heptane.) The intrinsic viscosity of the polypropylene will generally be in the range of about 2–4 dl./g., more usually in the range of about 2–3 dl./g. (decalin at 135° C.). Comparably, the melt flow rate will be in the range of about 0.1 to 12 grams per 10 minutes, more usually in the range of about 2 to 10 grams per 10 minutes. (ASTM D1238–57T, 2160 grams load at 230° C.)

Where the weight per unit length is a consideration and a twine of greater average diameter is desired, it may be advantageous to use a foamed polypropylene in preparing the twine.

Foamed polypropylene film from which foamed twine may be ultimately made is prepared by extruding polypropylene in the presence of a foaming agent which decomposes at about the extrusion temperature. Usually the extrusion temperature will be in the range of from about 350–500° F.; however, higher temperatures may be encountered if higher molecular weight polypropylene is used. Only a small amount of foaming agent is required. Normally, about 0.04–0.4 weight percent based on the polypropylene will be employed. More usually, about 0.1–0.2 weight percent will be used. The foaming agent is preferably in powder form and may be homogeneously mixed with the polypropylene in various ways, such as with a Prodex-Henschel Mixer.

The propylene used in preparing a foamed film will normally have a melt flow rate of at least about 3.0 gms. per 10 minutes, more usually, from about 4 to 12 gms. per 10 minutes. (ASTM D 1238–57T, 2160 gms. load at 230° C.) This polypropylene may be in the form of powder, pellets or kibble. Powdered polypropylene is preferred, as a more homogeneous mix with the foaming agent is obtained.

The general technology for preparing the film which is used as the precursor for the strips is well known in the art. Polypropylene powder or pellets are extruded in a commercial extruder to provide a web or film of desired thickness and width. Conveniently, a very wide film may be extruded which is then slit and trimmed to the desired width. The choice of width and thickness of the extruded film is dependent upon the desired ultimate width and thickness of the strips to be twisted into twine. For, in the subsequent processing of the film, both the thickness and the width will change. The width and thickness of the film will depend on the amount of trimming, as well as the draw ratio used when orienting the film.

Preferably, there will be an internal lubricant incorporated in the polypropylene. Both organic and inorganic lubricants may be used, which are soluble or insoluble in the polypropylene. The inorganic lubricants found advantageous for use in improving the performance of polypropylene binder twine are those identified as laminar solids, also known as solid or dry lubricants. These materials are characterized by a marked basal cleavage and include such compounds as mica, talc, $MoS_2$, and graphite. Preferred lubricants are the inorganic lubricants, particularly graphite and talc.

Among organic lubricants are mineral oils, polyglycols, e.g., polyethylene glycol, called Carbowax, nonionic detergents, e.g., nonyl phenol condensed with 12 moles ethylene oxide, etc.

The lubricants may be incorporated into the polypropylene in various ways prior to extrusion. The polypropylene, in powder or pellet form, and the particular lubricant, in powder or pellet form, may be mixed in an efficient melt mixer, such as a Banbury Mixer, or in a powder mixer, such as the Prodex-Henschel Mixer, until the mixture is relatively homogeneous. Alternatively, pellets containing the lubricant as a concentrate may be mixed with polypropylene pellets prior to extrusion.

The amount of the internal lubricant will generally vary from about 0.1 to 10 percent by weight of polypropylene, more usually about 0.5 to 6 percent by weight.

The film is then oriented by stretching, thus enhancing its tensile strength. A convenient method for orienting the film unidirectionally is to have the film fed from a roll turning at a lower speed than the take-up roll, while maintaining the film intermediate the two rolls at an elevated temperature, usually in the range of about 200 to 300° F. The film may be oriented in a single step or in two or more steps. It is preferred and superior results are obtained by orienting the film in a plurality of steps, preferably two steps. That is, the film will be stretched at least twice to achieve the ultimate orientation.

The draw ratios used in orienting the film will be ultimately at least 6.5:1, preferably 7.0:1. That is, either in a single stretch or in a series of stretches, the ultimate draw ratio will be within the indicated limits. Desirably, the ultimate draw ratio will be in the range of 7.0 to just below that which causes fibrillation of the film. Usually, the maximum draw ratio will not exceed about 10. When the film is drawn twice, generally the draw ratio for the first orientation will be about 2–5:1, with the second orientation providing the desired final draw ratio. When desired, the initially extruded film can be of such a size that the oriented film can then be split to strips of the desired width.

The size of the strip(s) will depend on the number to be used and the desired twine's dimensions. For a specific twine, the dimensions of the film strips will decrease with an increasing number of strips; conversely, the dimensions of the film strips will increase with a decreasing number of film strips. However, there are a minimum and maximum of width and thickness of the strip(s) which are necessary for the preparation of a satisfactory twine. The thickness of an unfoamed film strip should be in the range of about 0.3 to 3.0 mils, desirably about 0.8 to 1.5 mils. The unfoamed strip width will generally be in the range of about 0.5 to 5.0 inches, more usually in the range of about 0.8 to 2.5 inches. A foamed strip will usually have a thickness in the range of about 1.0 to 6 mils, more usually from about 1.5 to 3 mils. The width of a foamed strip should be about the same as the unfoamed.

The length of the strip(s) will generally be equal to the length of the twine. This may be achieved by bonding strips together or extruding the film continuously so as to produce a film of "infinite" length which may be cut to the desired length.

The oriented strips will have tensile strengths as measured as load to break in the range of 40,000 to 85,000 p.s.i. (A ½ inch wide specimen is placed in the jaws of an Instron apparatus set 2½ inches apart and stretched at a rate of 10 inches per minute. The load is measured at break.) The percent elongation at break will generally be in the range of 20 to 50%.

The strip or strips described above can now be twisted to form the twine. The strip or strips are rapidly led through an orifice or condenser of slightly larger dimension than the diameter of the twine, collapsing the strip or strips. The collapsed strip or strips are then subjected to a twist of about 3 to 25 turns per foot, desirably 8 to 15 turns per foot. The twine is then wound on a bobbin.

Usually, the twine will be twisted at ambient temperatures and will be cold set. However, temperatures from room (20° C.) to about 150° C. may be used in heating the film prior to collapsing it, the upper limits of the range providing a heat set.

During the spinning or twisting of the strips, an external lubricant may be applied to the film or twine. The film or twine may be coated with the lubricant by spraying, brushing, or other convenient means. Various lubricants can be used, such as mineral oils, castor oils, polyethylene oxide, polypropylene glycol, alkoxyphenoxy polyethylene glycols, alkoxyphenoxy polypropylene glycols, alkylphenoxy polyethylene glycols, alkylphenoxy polypropylene glycols, phenoxy polypropylene glycols, wax, water, etc. The various lubricants may be applied neat or as solutions in convenient media, e.g., water, ethanol, methanol, etc. Preferred lubricants are those which are not absorbed by the polypropylene, such as nonionic surfactants, e.g., alkoxyphenoxy polyethylene glycols, and inorganic lubricants, such as talc, graphite, molybdenum disulfide, etc.

After the films have been twisted to form the twine and the twine wound on a bobbin, the twine is usually rewound to form a ball which can be used in the baler. The ball must feed the twine from the inside and must have a stable structure, so that it neither collapses nor telescopes when the twine is withdrawn. The machinery used for preparing balls from sisal is readily adapted to prepare the ball from the polypropylene twine of this invention.

The number of strips used in the formation of the twine will generally be from 1 to 12, more usually from 1 to 6, desirably from 2 to 4.

The twine prepared for baling according to this invention will generally weigh between about 0.4 to 2.0 grams per 10 inches, more usually about 0.75 to 1.5 grams per 10 inches. The diameter of the twine will be in the range of about 0.08 to 0.15 inch, more usually in the range of about 0.1 to 0.15 inch. The diameter of the twine may be varied by increasing the thickness of the polypropylene strip(s) or by using foamed polypropylene strip(s).

The twine prepared for baling will have a strength measured as load to break of at least 200 pounds and generally at least 250 pounds. The knot strength measured as load to break will generally be at least 140 pounds and more usually at least 150 pounds. [These strengths were measured by ASTM method D1380–62T (Ref. ASTM Standards in Textile Materials, 33rd Edition, October 1962), using an Instron apparatus with snubbing-type clamps having a semi-involute surface. The jaws moved at a rate of 10 inches per minute. The results are obtained as breaking load in pounds.]

The twine has a relatively smooth surface which permits it to slide evenly across the rough surface of crops being baled, rather than being caught and abraded by the stems. Its substantially uniform diameter permits smooth operation of the baler. Moreover, perfect knots are repeatedly tied and the twine is readily cut, giving a clean cut which prevents ragged, loose ends.

The following examples are offered by way of illustration and not by way of limitation.

*Example 1*

Commercial polypropylene pellets having an intrinsic viscosity of about 2.5 dl./g. (Decalin at 135°C.), a melt flow rate of about 2.5 to 4.0 and an isotacticity of about 95% were fed into a commercial extruder. The temperature of the extruder at equilibrium between the pellets and the extruder, as well as the die temperature, was about 500° F. The die opening was maintained at 15 mils and a screen of 80 mesh was used. The extruder screw turned at 25.5 r.p.m. providing a takeoff of 10 feet per minute of film having 5 to 6 mils thickness and 5.2 inches in width.

The film was trimmed to 3.0 inches in width and oriented at a draw ratio of 7.0, at a temperature of 275° F. The final film strip had a 1 mil thickness and a width of about 2.1 to 2.4 inches.

Two strips of this film were fed simultaneously and superimposed to a spinning jenny having a condenser with a 0.140 inch orifice and a modified nipper consisting of three pulleys adapted to prevent twisting at the condenser face. A lubricant, 1% nonyloxyphenoxydodecaoxyethylene alcohol in water, was sprayed onto the twisted strips as they left the condenser and before they entered the nipper.

A twist of 11.5 turns per foot was applied to the strips. The resulting twine had approximately a 0.1 inch diameter and a weight of 0.78 gram per 10 inches.

The following table compares the strength of various films used for preparing twine at different draw ratios and the strength of the twine obtained from such films, using the method described in Example 1.

TABLE I

|  | A | B | C |
| --- | --- | --- | --- |
| Orientation (draw ratio) | 6.5:1 | 7.0:1 | 7.5:1 |
| Tensile properties: |  |  |  |
| Film— |  |  |  |
| Tensile strength, pounds per square inch [1] | 52,000 | 57,000 | 60,000 |
| Percent elongation at break | 40 | 34 | 28 |
| Twine— |  |  |  |
| Load to break, pounds [2] | 230 | 260 | 260 |
| Knot strength, pounds [3] | 160 | 160 | 160 |

[1] A ½ inch wide specimen is placed in the jaws of an Instron apparatus set 2½ inches apart and stretched at a rate of 10 inches per minute. The load is measured at break.
[2] ASTM D1380-62T.
[3] Same as ASTM D1380-62T, except with a knot in the middle of the 10 inch specimen.

weighing about 0.87 gram per 10 inches. The diameter of the twine was about 0.1 inch. The twine had a strength as measured as load to break of 270 pounds and a knot strength of 170 pounds.

*Example 3*

Commercial polypropylene pellets were mixed with candidate lubricants in the desired proportions in a Banbury Mixer until the mixture was relatively homogeneous. In some instances, the lubricant was incorporated in polypropylene pellets as a concentrate and the pellet concentrates mixed with the polypropylene pellets in a Banbury Mixer. The polypropylene combined with the lubricant was then extruded under conditions similar to that described in Example 1.

The film was then trimmed and oriented by drawing at the ratio indicated in Table II. Usually, a lubricant was sprayed onto the film strips prior to their being wound on the bobbin. The strips were twisted under the conditions described in Example 1. After being wound on the bobbin, the twine was rewound to form a ball which could be used in a baler. The balled twine was then tested as to load necessary to break and knot strength.

In a few instances, the twine was used in an actual baling operation with a commercial baler, using alfalfa, wheat or barley straw and keeping the bale density within the range of 9 to 12 pounds per cubic foot. In the table is indicated the tension on the twine during baling, percent efficiency—100% indicating that there were no failures, i.e., no knot slipping nor twine breaking—and the knot strength and the twine strength as pounds to break.

The following table indicates the results obtained.

TABLE II

| Ex. No. 3 | Orientation | | Film Strip | | | Number of Films in Twine | External Lubricant [1] | Internal Lubricant, wt. percent | After Balling | | | Baler Tests | | Strength | |
| --- | --- | --- | --- | --- | --- | --- | --- | --- | --- | --- | --- | --- | --- | --- | --- |
| | Draw Ratio | Temp., °F. | Thickness, mil | Width | Wt., gm./10" | | | | Percent Ext | Lbs. to Break | Knot Strength | Tension | Percent Eff. | Twine, lbs. | Knot, lbs. |
| A | 7.0/1 | 275 | 1.0 | 2.4 | 0.37 | 2 | (a) | Polyethylene,[2] 5. | 26.5 | 260 | 165 | 2 | 100 | 220 | 170 |
| B | 7.0/1 | 275 | 1.0 | 2.3 | 0.38 | 2 | (a) | | 25 | 270 | 160 | 2 | 100 | 210 | 165 |
| C | 7.0/1 | 275 | 1.0 | 2.3 | 0.39 0.36 | 2 | (b) | | 23 | 265 | 165 | 2 | 100 | 190 | 150 |
| D | 7.0/1 | 275 | 1.0 | 1.9 | 0.38 | 2 | | Graphite flake,[3] 1. | 23 | 245 | 135 | 2 | 100 | 230 | 155 |
| E | 7.0/1 | 275 | 1.0 | 2.3 | 0.37 | 2 | (a) | Molybdenum disulfide, 1. | 25 | 235 | 160 | | | | |
| F | 7.0/1 | 275 | 1.0 | 1.2 | [4] 0.20 | 4 | (a) | | | 265 | 180 | | | | |

[1] (a) 0.9 parts Carbowax 1000. 0.1 parts nonyloxyphenoxy dodecaoxyethylene alcohol. } 1 weight percent in water.
(b) 1% nonyloxyphenoxy dodecaoxyethylene alcohol in water.
[2] Du Pont "Alathon 4470" having a density of 0.936.
[3] Dixon #635 graphite, 75% of which passes through a 200 mesh screen.
[4] The weight given is an average for two strips.

*Example 2*

The procedure described in Example 1 was followed, except that the strips were split to half the width, that is, about 1.2 inches, and 4 strips were used to give a twine

*Example 4*

The procedure described in Example 3 was followed except that a two fold stretching was used to orient the film. The following table indicates the draw ratio of the first stretching and the total draw ratio, as well as the same information as included in Table II.

In a few instances, foamed twines were used in actual baling operations under severe conditions. The knotting

TABLE III

| Ex. No. 4 | Orientation | | | | Film Strip | | | Number of Films in Twine | External Lubricant[1] | Internal Lubricant, wt. percent | After Balling | | | Baler Tests | | |
|---|---|---|---|---|---|---|---|---|---|---|---|---|---|---|---|---|
| | 1st | | 2nd | | Thickness, mils | Width, inches | Wt., gm./10" | | | | Percent Ext. | Lbs. to Break | Knot Strength | Tension | Strength | |
| | Draw Ratio | °F. | Total Draw Ratio | °F. | | | | | | | | | | | Twine, lbs. | Knot, lbs. |
| A | 3.3/1 | 275 | 7.6/1 | 285 | 1.1 | 2.0 / 2.0 | 0.38 / 0.38 | 2 | Yes | Graphite,[2] 1 | | 290 | 150 | 5-7 | 220 | 155 |
| B | 3.2/1 | 275 | 7.6/1 | 285 | 1.1 | 2.1 / 2.1 | 0.37 / 0.37 | 2 | Yes | Graphite,[3] 1 | | 290 | 160 | | | |
| C | 3.2/1 | 275 | 7.6/1 | 285 | 1.0 | 2.1 / 2.1 | 0.37 / 0.37 | 2 | None | do[3] | | 280 | 140 | | | |
| D | 4.9/1 | 275 | 7.6/1 | 285 | 1.1 | 2.1 / 2.1 | 0.37 / 0.37 | 2 | Yes | Graphite,[4] 1 | 30 | 290 | 185 | 0 | 250 | 180 |
| E | 4.9/1 | 275 | 7.6/1 | 285 | 1.1 | 2.1 / 2.1 | 0.37 / 0.37 | 2 | None | do[4] | 30 | 285 | 155 | 0 | 240 | 160 |
| F | 3.3/1 | 275 | 7.6/1 | 285 | 1.1 | 2.4 / 2.2 | 0.44 / 0.37 | 2 | Yes | Graphite,[3] 1 | 29 | 285 | 170 | | | |
| G | 3.3/1 | 275 | 7.6/1 | 285 | 1.1 | 2.2 / 2.1 | 0.39 / 0.39 | 2 | Yes | do[3] | 30 | 285 | 180 | | | |
| H | 3.3/1 | 275 | 7.6/1 | 285 | 1.0 / 1.0 | 2.4 / 2.4 | 0.40 / 0.39 | 2 | Yes | Graphite,[4] 1 | 33 | 282 | 188 | | | |
| I | 3.3/1 | 275 | 8.0/1 | 285 | 1.0 / 1.0 | 2.3 / 2.3 | 0.39 / 0.38 | 2 | Yes | Graphite,[3] 1 | | 265 | 160 | | | |
| J | 3.3/1 | 275 | 7.6/1 | 285 | 1.0 | 2.2 / 2.2 | 0.41 / 0.40 | 2 | Yes | Graphite,[4] 1 | 32 | 305 | 180 | | | |
| K | 3.3/1 | 275 | 7.6/1 | 285 | 1.2 | 4.2 | 0.78 | 1 | Yes | Graphite,[3] 1 | | 260 | 170 | 4-5 | 180 | 145 |
| L | 3.3/1 | 275 | 7.6/1 | 285 | 2.6 | 2.1 | 0.83 | 1 | Yes | do[3] | | 250 | 150 | 3-4 | 200 | 150 |
| M | 4.0/1 | 275 | 9.5/1 | 285 | | | | 2 | Yes | do[3] | | 305 | 180 | | | |
| N | 3.2/1 | 274 | 7.6/1 | 281 | 2.1 | 3.0 | 0.96 | 4 | No | do[3] | | 294 | | | | |
| O | 4.0/1 | 276 | 7.6/1 | 283 | 1.1 | 4.1 | 0.68 | 3 | No | do[3] | | 336 | | | | |
| P | 4.0/1 | 276 | 7.6/1 | 282 | 1.4 | 3.9 | 0.79 | 2 | No | do[3] | | 271 | | | | |
| Q | 4.0/1 | 274 | 8.0/1 | 284 | 1.3 | 1.8 | 0.79 | 2 | No | Talc, 1 | | 244 | | | | |

[1] 0.9 parts Carbowax 1000. 0.1 part nonylphenoxy dodecaoxyethylene alcohol in water.} 1 weight percent in water.
[2] Dixon #635 graphite, 75% of which passes through a 200 mesh screen.
[3] Acheson "#39" graphite, 98% of which passes through a 200 mesh screen.
[4] Dixon "Microfyne" graphite, 95% of which passes through a 325 mesh screen.

Example 5

Commercial polypropylene powders (MFR 2.6–8.0 at 2160 grams load, 230° C.) were mixed with the foaming agent azo (bis)formamide, also as a powder, and an internal lubricant in the desired proportions in a Henschel Mixer until the mixture was relatively homogeneous. The polypropylene combined with the foaming agent and lubricant was then extruded under conditions similar to those described in Example 1.

The resulting foamed film was then trimmed and drawn at the ratio indicated in Table IV. The strips were twisted under conditions described in Example 1. After being wound on the bobbin, the foamed twine was rewound to form a ball which could be used in a baler. The foamed twine was then tested as to load necessary to break. The particulars of these foamed twines and their load testing are reported in Table IV.

efficiency of these foamed twines was equal to the unfoamed twines and in some instances it was measurably higher.

It is evident from the data contained in the foregoing tables that the polypropylene twine of this invention provides excellent results in efficiently baling crops, providing equal or superior properties to that of sisal twine. Not only does the polypropylene twine of this invention have equal or superior knot strength to sisal twine, but also provides for the smooth operation of commercial equipment, as well as providing the advantages in using polypropylene over sisal, such as resistance to rotting. The following data demonstrate this superiority.

Both sisal and polypropylene binder twines were tested as to durability upon exposure to natural and artificial

TABLE IV

| Ex. No. 5 | Melt Flow Rate, Polypropylene | Foaming Agent, wt. Percent | Orientation | | | | Film Strip | | | Number of Strips in Twine | External Lubricant | Internal Lubricant, wt. Percent | Strength After Balling, lbs. to break |
|---|---|---|---|---|---|---|---|---|---|---|---|---|---|
| | | | 1st | | 2nd | | Thickness, mils | Width, inches | Density, gm./cm.³ | | | | |
| | | | Draw Ratio | (±1°) °F. | Total Draw Ratio | (±1°) °F. | | | | | | | |
| A | 3.3–3.7 | 0.4 | 4/1 | 275 | 7.6 | 285 | 3.85 | 1.0 | 0.78 | 2 | No | Graphite,[1] 1 | 211 |
| B | 3.3–3.7 | 0.25 | 4/1 | 275 | 7.7 | 285 | 3.15 | 1.25 | 0.78 | 2 | No | do[1] | 239 |
| C | 3.3–3.7 | 0.15 | 4/1 | 275 | 7.8 | 285 | 2.25 | 1.60 | 0.84 | 2 | No | do[1] | 239 |
| D | 2.6 | 0.15 | 4/1 | 275 | 7.8 | 285 | 4.9 | 0.85 | 0.72 | 2 | No | do[1] | 220 |
| E | 4.0 | 0.15 | 4/1 | 275 | 7.8 | 285 | 4.0 | 0.97 | 0.78 | 2 | No | do[1] | 218 |
| F | 4.5 | 0.10 | 4/1 | 275 | 9.1 | 285 | 3.8 | 0.98 | 0.78 | 2 | No | do[1] | 216 |
| G | 6.5–8.0 | 0.10 | 4/1 | | 9.0 | | 2.8 | 1.25 | 0.73 | 2 | No | do[1] | 247 |

[1] Graphite particles—98-100% passing through a 200 mesh screen.

weathering conditions. The loss in strength over the test period is given in the following table.

TABLE V.—UNKNOTTED TWINE

| Exposure (hours) | Breaking Strength, lbs. | | | | | |
|---|---|---|---|---|---|---|
| | Weather Ometer Test [1] | | Fade Ometer Test [2] | | Sacramento, California | |
| | Sisal | Polypropylene | Sisal | Polypropylene | Sisal | Polypropylene |
| 0 | 312 | 235 | 312 | 235 | 312 | 235 |
| 44 | | | | | 255 | 205 |
| 200 | 135 | 195 | 210 | 210 | | |
| 600 | 20 | 155 | | | | |
| 1,000 | 5 | 85 | | | | |

[1] Weather Ometer Test consists in exposing specimens to alternating periods of light and water spray according to ASTM method E42-57 using Type D apparatus with two carbon arcs and a 102-18 cam; water spray was at ambient temperature.
[2] Fade Ometer Test was carried out the same as the Weather Ometer Test except only one carbon arc was employed and without water spray.

As will be evident to those skilled in the art, various modifications on this process can be made or followed, in the light of the foregoing disclosure and discussion, without departing from the spirit or scope of the disclosure or from the scope of the following claims.

I claim:

1. Polypropylene twine comprising at least one film strip of isotactic polypropylene twisted and set to form said twine;
   wherein the film strips embodying the twine have the following characteristics:
   at least 0.5 inch wide, unfractured,
   continuous longitudinally and across their widths, and
   uniaxially oriented to a draw ratio of at least 6 and below fibrillation.

2. A twine according to claim 1 containing an internal lubricant.

3. A twine according to claim 1 having from 0.1 to 8 percent by weight of an internal lubricant.

4. A twine according to claim 1 wherein said twine contains from 0.1 to 8 percent by weight of a fine mesh graphite.

5. A twine according to claim 1 wherein said isotactic polypropylene is foamed isotactic polypropylene.

6. Polypropylene twine comprising at least one film strip of isotactic polypropylene twisted from about 3 to 25 turns per foot and set to form said twine;
   wherein the film strips embodying the twine have the following characteristics:
   unfractured,
   continuous longitudinally and across their widths, at least 0.5 inch wide,
   uniaxially oriented to a draw ratio of at least 6 and below fibrillation,
   having from 0.5 to 6 percent by weight of an inorganic internal lubricant,
   and wherein said twine has a weight of from about 0.7 to 3 grams per 10 inches.

7. A twine according to claim 6 having from 1 to 6 strips.

8. A twine according to claim 6 wherein said internal lubricant is graphite, and an external lubricant comprising predominantly a nonionic surfactant is applied to the exterior of said twine.

9. A twine according to claim 6 wherein said isotatic polypropylene is foamed isotactic polypropylene.

10. Polypropylene twine comprising at least one film strip of isotactic polypropylene twisted from about 3 to 25 turns per foot and set to form said twine;
    wherein the film strips embodying the twine have the following characteristics:
    unfractured,
    continuous longitudinally and across their widths, at least 0.5 inch wide,
    uniaxially oriented to a draw ratio of at least 6 and below fibrillation,
    having from 0.5 to 6 percent by weight of an inorganic internal lubricant,
    wherein said twine has a weight of from about 0.7 to 3 grams per 10 inches, and
    wherein said twine has a knot strength of at least 140 pounds.

11. A twine according to claim 10 wherein said internal lubricant is graphite.

12. A twine according to claim 10 wherein the said draw ratio is in the range of from 7 to 10:1 and said internal lubricant is selected from the group consisting of talc and graphite.

13. A twine according to claim 10 wherein said isotactic polypropylene is foamed isotactic polypropylene.

14. A twine according to claim 1 having 2 to 4 strips.

15. A twine according to claim 1 wherein the film strips have tensile strengths in the range of 40,000 to 85,000 p.s.i.

References Cited

UNITED STATES PATENTS

| | | | |
|---|---|---|---|
| 448,174 | 3/1891 | Williams et al. | 57—154 |
| 1,921,121 | 5/1933 | Barnum | 57—150 X |
| 1,994,057 | 3/1935 | Wallach | 57—154 |
| 2,326,043 | 8/1943 | Liebig | 57—140 |
| 2,372,142 | 3/1945 | Warren | 57—140 X |
| 2,407,926 | 9/1946 | Hamilton | 57—154 |
| 2,856,750 | 10/1958 | Lewis | 57—140 X |
| 2,981,052 | 4/1961 | Mac Henry | 57—150 X |
| 3,019,507 | 2/1962 | Maragliano | 28—1 X |
| 3,029,590 | 4/1962 | Caroselli | 57—153 |
| 3,118,161 | 1/1964 | Crampton | 28—1 X |
| 3,126,699 | 3/1964 | Lefevre et al. | 57—151 X |
| 3,168,802 | 2/1965 | Linke et al. | 57—155 X |
| 3,214,899 | 11/1965 | Wininger | 57—140 |
| 3,273,771 | 9/1966 | Beaumont | 225—3 |

FRANK J. COHEN, Primary Examiner.

D. E. WATKINS, Assistant Examiner.